United States Patent
Reichelt et al.

(10) Patent No.: US 9,512,253 B2
(45) Date of Patent: *Dec. 6, 2016

(54) POLYPROPYLENE COMPOSITION WITH IMPROVED SEALING AND THERMAL PROPERTIES

(71) Applicant: Borealis AG, Vienna (AT)

(72) Inventors: Kristin Reichelt, Nuehofen/Krems (AT); Juha Paavilainen, Helsinki (FI); Matthew Parkinson, Linz (AT)

(73) Assignee: Borealis AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/379,935

(22) PCT Filed: Feb. 26, 2013

(86) PCT No.: PCT/EP2013/053761
§ 371 (c)(1),
(2) Date: Aug. 20, 2014

(87) PCT Pub. No.: WO2013/127758
PCT Pub. Date: Sep. 6, 2013

(65) Prior Publication Data
US 2015/0018492 A1    Jan. 15, 2015

(30) Foreign Application Priority Data
Feb. 27, 2012   (EP) .................................. 12157060

(51) Int. Cl.
*C08L 23/16*   (2006.01)
*C08F 210/06*  (2006.01)
*C08L 23/10*   (2006.01)
*C08L 23/12*   (2006.01)
*C08L 23/14*   (2006.01)

(52) U.S. Cl.
CPC ............. *C08F 210/06* (2013.01); *C08L 23/10* (2013.01); *C08L 23/12* (2013.01); *C08L 23/14* (2013.01); *C08L 2203/162* (2013.01); *C08L 2205/02* (2013.01); *C08L 2205/03* (2013.01); *C08L 2207/04* (2013.01)

(58) Field of Classification Search
CPC ......... C08L 23/10; C08L 23/14; C08L 23/142; C08L 23/16; C08L 23/20; C08L 2205/03; C08L 2203/16; C08L 2203/162; C08L 2207/02; C08L 2207/04
See application file for complete search history.

(56) References Cited

U.S. PATENT DOCUMENTS

| | | | | |
|---|---|---|---|---|
| 6,342,564 | B1 * | 1/2002 | Pitkanen | B01J 8/24 525/191 |
| 7,288,598 | B2 * | 10/2007 | Pelliconi | C08L 23/08 525/240 |
| 8,779,062 | B2 * | 7/2014 | Paavilainen | C08F 210/06 525/191 |
| 8,816,010 | B2 * | 8/2014 | Tranninger | C08L 23/10 524/451 |
| 8,889,792 | B2 * | 11/2014 | Paavilainen | C08J 5/18 525/191 |
| 9,096,752 | B2 * | 8/2015 | Grestenberger | C08L 23/10 |
| 2007/0203298 | A1 | 8/2007 | Massari | |
| 2014/0005324 | A1 * | 1/2014 | Reichelt | C08J 5/18 524/528 |

FOREIGN PATENT DOCUMENTS

| | | |
|---|---|---|
| CN | 1261390 A | 7/2000 |
| EP | 2319885 A1 | 9/2011 |
| EP | 2368921 A1 | 9/2011 |
| WO | 98/59002 A1 | 12/1998 |
| WO | 2010142540 A1 | 12/2010 |
| WO | 2011131639 A1 | 10/2011 |

OTHER PUBLICATIONS

First Chinese Office Action dated Sep. 6, 2015.

* cited by examiner

*Primary Examiner* — Rip A Lee
(74) *Attorney, Agent, or Firm* — Tarolli, Sundheim, Covell & Tummino LLP

(57) ABSTRACT

The present invention relates to a polypropylene composition comprising comonomer units derived from ethylene in an amount of from 0.5 wt % to 25 wt %, and from at least one $C_{5-12}$ alpha-olefin in an amount of from 1.0 mol % to 3.0 mol %, wherein the polypropylene composition has an amount of xylene solubles XS of at least 20 wt %, and the xylene solubles have an amount of ethylene-derived comonomer units of from 4 wt % to 50 wt %.

12 Claims, No Drawings

POLYPROPYLENE COMPOSITION WITH IMPROVED SEALING AND THERMAL PROPERTIES

RELATED APPLICATION

This application is a National Phase filing of PCT/EP2013/053761, filed Feb. 26, 2013, and claims priority to European Application No. 12157060.0, filed Feb. 27, 2012, the subject matter of which are incorporated herein by reference in their entirety.

Polypropylene is used in areas where sealing properties are relevant, e.g. in the food packaging industry.

Heat sealing is the predominant method of manufacturing flexible and semi-rigid packages. Important characteristics of good sealing performance are inter alia low seal initiation temperature which is needed to support high speed on packaging machines, high heat seal strength, and high melting point which is important, in particular for biaxially oriented PP, to avoid stickiness and blocking and accomplish high BOPP line speeds. Furthermore, it is also desired to have a packaging material of improved optical properties such as low haze or high clarity.

It frequently turns out that improvement of one of these properties is achieved on the expense of the other properties.

There is still a need to design materials having an improved balance between high melting point and low sealing initiation temperature SIT, and also giving beneficial optical properties and sufficiently high seal strength.

According to a first aspect of the present invention, the object is solved by providing a polypropylene composition comprising comonomer units derived from ethylene in an amount of from 0.5 wt % to 25 wt %, and from at least one $C_{5-12}$ alpha-olefin in an amount of from 1.0 mol % to 3.0 mol %, wherein the polypropylene composition has an amount of xylene solubles XS of at least 20 wt %, and the xylene solubles have an amount of ethylene-derived comonomer units of from 4 wt % to 50 wt %.

Preferably, the at least one $C_{5-12}$ alpha-olefin is selected from 1-hexene, 1-octene, or any mixture thereof.

As indicated above, the polypropylene composition comprises comonomer units derived from ethylene in an amount of from 0.5 wt % to 25 wt %.

In a preferred embodiment, the amount of the comonomer units derived from ethylene in the polypropylene composition is from 0.8 wt % to 15 wt %, more preferably from 1.0 wt % to 10 wt %, even more preferably from 1.0 wt % to 6.0 wt %, like 1.0 wt % to 4.0 wt %.

As indicated above, the polypropylene composition comprises comonomer units derived from at least one $C_{5-12}$ alpha-olefin in an amount of from 1.0 mol % to 3.0 mol %.

In a preferred embodiment, the amount of the comonomer units derived from the at least one $C_{5-12}$ alpha-olefin, more preferably from 1-hexene or 1-octene, in the polypropylene composition is from 1.5 mol % to 2.5 mol %.

If the $C_{5-12}$ alpha-olefin is 1-hexene and its amount is indicated in wt %, the amount of 1-hexene-derived comonomer units in the propylene polymer composition is preferably from 2.0 wt % to 6.0 wt %, more preferably from 3.0 wt % to 5.0 wt %.

If the $C_{5-12}$ alpha-olefin is 1-octene and its amount is indicated in wt %, the amount of 1-octene-derived comonomer units in the propylene polymer composition is preferably from 2.5 wt % to 7.5 wt %, more preferably from 4.0 wt % to 6.5 wt %.

As will be discussed below, the polypropylene composition may optionally contain one or more additives. Preferably, the amounts of comonomer units derived from ethylene and/or at least one $C_{5-12}$ alpha-olefin in the polypropylene composition are based on the total amount of propylene polymer(s) being present in the composition.

As will also be discussed in further detail below, the polypropylene composition may contain just one propylene polymer fraction (i.e. prepared in a single step polymerization process) or may alternatively contain a mixture of two or more (e.g. three) propylene polymer fractions which are preferably prepared in a sequence of at least two (e.g. three) polymerization reactors (i.e. so-called reactor-blending). If there are two or more propylene polymer fractions, it is the total weight of these fractions on which the amounts of comonomer units derived from ethylene and/or at least one $C_{5-12}$ alpha-olefin in the polypropylene composition are based.

In a preferred embodiment, the polypropylene composition does not contain any butene-derived (such as 1-butene-derived) comonomer units.

In a preferred embodiment, the polypropylene composition is a terpolymer, wherein the $C_{5-12}$ alpha-olefin is preferably either 1-hexene or 1-octene. Thus, the polypropylene composition is preferably either a terpolymer composition containing ethylene- and 1-hexene-derived comonomer units or alternatively a terpolymer composition containing ethylene- and 1-octene-derived comonomer units.

As indicated above, the polypropylene composition has an amount of xylene solubles XS of at least at least 20 wt %.

The amount of xylene solubles XS (sometimes also referred to as xylene cold solubles XCS) is a parameter frequently used to determine the amount of those components within a polymer composition which are mainly amorphous and/or elastomeric or of low crystallinity. The measuring method is described in further detail below under the headline "Measuring Methods". As a first approximation, the amount of the xylene solubles XS corresponds to the amount of rubber and those polymer chains of the matrix with low molecular weight and low stereoregularity.

Preferably, the amount of xylene solubles XS of the polypropylene composition is from 20 wt % to 60 wt %, more preferably from 20 wt % to 50 wt % even more preferably from 20 wt % to 42 wt %.

Preferably, the amount of xylene solubles of the polypropylene composition is based on the total amount of propylene polymer(s) being present in the composition. The polypropylene composition may contain just one propylene polymer fraction (i.e. prepared in a single step polymerization process) or may alternatively contain a mixture of two or more (e.g. three) propylene polymer fractions which are preferably prepared in a sequence of at least two (e.g. three) polymerization reactors (i.e. so-called reactor-blending). If there are two or more propylene polymer fractions, it is the total weight of these fractions on which the amount of xylene solubles of the polypropylene composition is based.

As indicated above, the xylene solubles of the polypropylene composition have an amount of ethylene-derived comonomer units of from 4 wt % to 50 wt %.

In a preferred embodiment, the amount of the ethylene-derived comonomer units in the xylene solubles is from 5 wt % to 30 wt %, more preferably from 5 wt % to 20 wt %, even more preferably from 5 wt % to 12 wt %.

In the present invention, it is preferred that that the majority of the ethylene-derived comonomer units of the polypropylene composition are present in the elastomeric parts or domains of the composition.

In a preferred embodiment, the polypropylene composition satisfies the following relation:

$$[C2(XS) \times XS/100]/C2(\text{total}) \geq 0.9$$

wherein

C2(XS) is the amount in wt % of the ethylene-derived comonomer units in the xylene solubles, XS is the amount in wt % of xylene solubles of the polypropylene composition, C2(total) is the amount in wt % of the ethylene-derived comonomer units in the polypropylene composition.

In a preferred embodiment, $[C2(XS) \times XS/100]/C2(\text{total}) \geq 0.95$; even more preferably $1.0 \geq [C2(XS) \times XS/100]/C2(\text{total}) \geq 0.95$.

Preferably, the xylene solubles contain an amount of comonomer units which are derived from the least one $C_{5-12}$ alpha-olefin such as 1-hexene and/or 1-octene of from 0.01 mol % to 2.0 mol %, more preferably from 0.05 mol % to 1.0 mol %.

If the $C_{5-12}$ alpha-olefin is 1-hexene and its amount is indicated in wt %, the amount of 1-hexene-derived comonomer units in the xylene solubles is preferably from 0.02 wt % to 4.0 wt %, more preferably from 0.1 wt % to 2.0 wt %.

If the $C_{5-12}$ alpha-olefin is 1-octene and its amount is indicated in wt %, the amount of 1-octene-derived comonomer units in the xylene solubles is preferably from 0.03 wt % to 5.0 wt %, more preferably from 1.3 wt % to 2.5 wt %.

Preferably, the total amount of comonomer units, more preferably of the comonomer units derived from ethylene and at least one $C_{5-12}$ alpha-olefin, in the polypropylene composition is preferably from 1.7 mol % to 33 mol %, more preferably from 2.5 mol % to 14 mol %, even more preferably from 3.0 mol % to 8.5 mol %.

If the $C_{5-12}$ alpha-olefin is 1-hexene and its amount is indicated in wt %, the total amount of ethylene- and 1-hexene-derived comonomer units in the polypropylene composition is preferably from 2.5 wt % to 31 wt %, more preferably from 4 wt % to 9 wt %.

If the $C_{5-12}$ alpha-olefin is 1-octene and its amount is indicated in wt %, the total amount of ethylene- and 1-octene-derived comonomer units in the polypropylene composition is preferably from 3.0 wt % to 30 wt %, more preferably from 5.0 wt % to 11 wt %.

As already indicated above, the amounts of comonomer units derived from ethylene and/or at least one $C_{5-12}$ alpha-olefin in the polypropylene composition are preferably based on the total amount of propylene polymer(s) being present in the composition. If there are two or more propylene polymer fractions, it is the total weight of these fractions on which the amounts of comonomer units derived from ethylene and/or at least one $C_{5-12}$ alpha-olefin in the polypropylene composition are based.

Melt flow rate MFR (2.16 kg, 230° C.) of the polypropylene composition can be varied over a broad range. Preferably, the polypropylene composition has a melt flow rate MFR (2.16 kg, 230° C.) of from 2.0 to 30 g/10 min, more preferably 3.0 to 25 g/10 min, even more preferably from 5.0 to 20 g/10 min.

The xylene solubles of the polypropylene composition may have an intrinsic viscosity IV of at least 0.7 dl/g, more preferably of from 0.7 to 3.0 dl/g, even more preferably of from 0.7 to 2.0 dl/g, such as 0.8 to 1.8 dl/g.

The xylene solubles can be completely amorphous or may still have some degree of crystallinity. Preferably the xylene solubles have some crystallinity and the melting enthalpy $\Delta H_m(XS)$ of the xylene solubles is preferably within the range of from 0.5 to 60 J/g, more preferably from 0.5 to 50 J/g.

As already indicated above, the polypropylene composition may contain just one propylene polymer fraction (i.e. prepared in a single step polymerization process) or may alternatively contain a mixture of two or more (e.g. three) propylene polymer fractions which are preferably prepared in a sequence of at least two (e.g. three) polymerization reactors (i.e. so-called reactor-blending).

In a preferred embodiment, the polypropylene composition is a reactor blend. Preferably, the reactor blend comprises at least two, more preferably at least three different propylene polymer fractions prepared by sequential polymerization in at least three polymerization reactors.

In a preferred embodiment, the polypropylene composition is a blend, preferably a reactor blend, comprising the following propylene polymer fractions P1, P2 and P3:

(P1) a propylene homopolymer or a propylene copolymer comprising comonomer units derived from at least one $C_{5-12}$ alpha-olefin in an amount of less than 1.0 mol %, more preferably of from 0.1 to less than 1.0 mol % or from 0.2 to less than 1.0 mol %, (P2) a propylene copolymer comprising comonomer units derived from at least one $C_{5-12}$ alpha-olefin in an amount of from 2.0 mol % to 7.0 mol %, more preferably in an amount of from 2.5 mol % to 6.0 mol %, and (P3) a propylene copolymer comprising ethylene-derived comonomer units in an amount of from 4.0 wt % to 50 wt %, more preferably 5.0 wt % to 30 wt %, even more preferably 5.0 wt % to 20 wt % or from 5.0 wt % to 12 wt %.

Preferably, each of the propylene polymer fractions P1 and P2 contains less than 1.0 wt % of ethylene-derived comonomer units, more preferably neither P1 nor P2 contains ethylene-derived comonomer units.

If the propylene polymer fraction P1 contains comonomer units derived from at least one $C_{5-12}$ alpha-olefin such as 1-hexene and/or 1-octene, it is preferably the same $C_{5-12}$ alpha-olefin as in the propylene polymer fraction P2.

Optionally, the propylene polymer fraction P3 may additionally contain comonomer units derived from at least one $C_{5-12}$ alpha-olefin, such as 1-hexene or 1-octene. If present, it is preferably the same $C_{5-12}$ alpha-olefin as in polymer component P2. In a preferred embodiment, the propylene polymer fraction P3 contains less than 2.0 mol %, more preferably from 0.1 mol % to less than 1.0 mol % of comonomer units derived from at least one $C_{5-12}$ alpha-olefin.

Preferably, the propylene polymer fraction P1 is present in the polypropylene composition in an amount of from 20 to 50 wt %, more preferably from 20 to 45 wt %, based on the total weight of P1+P2+P3.

Preferably, the propylene polymer fraction P2 is present in the polypropylene composition in an amount of from 20 to 50 wt %, more preferably from 20 to 45 wt %, based on the total weight of P1+P2+P3.

Preferably, the propylene polymer fraction P3 is present in the polypropylene composition in an amount of from 20 to 50 wt %, more preferably from 20 to 45 wt %, based on the total weight of P1+P2+P3.

In a preferred embodiment, the polypropylene composition is a heterophasic polypropylene composition comprising a polymer matrix and a dispersed polymer phase (i.e. dispersed in said matrix).

Preferably, the dispersed polymer phase comprises the propylene polymer fraction P3 as described above.

Preferably, the propylene polymer fraction P1 has a melt flow rate MFR (2.16 kg/230° C.) of from 1 to 20 g/10 min, more preferably from 2 to 10 g/10 min.

Preferably, the propylene polymer fraction P2 has a melt flow rate MFR (2.16 kg/230° C.) of less than 30 g/10 min.

Preferably, the propylene polymer fraction P3 has an intrinsic viscosity IV of at least 0.7 dl/g, more preferably of from 0.7 to 3.0 dl/g, even more preferably 0.7 to 2.0 dl/g or from 0.8 to 1.8 dl/g.

Preferably, the amounts of xylene solubles of the mixture of the propylene polymer fraction P1 and the propylene polymer fraction P2 are less than 10 wt %.

The polypropylene composition may contain additives known in the art, like antioxidants, nucleating agents, slip agents and antistatic agents. Typically the composite does not contain more than 7 wt.-%, more preferably not more than 5 wt.-%, or not more than 2.5 wt.-% of additives mentioned herein, based on the total weight of the polypropylene composition.

According to a further aspect, the present invention provides a polymer film comprising the polypropylene composition as defined above.

Preferably, the polymer film has a sealing initiation temperature SIT of 110° C. or less, more preferably 100° C. or less, even more preferably 95° C. or less.

In a preferred embodiment, the polymer film has a sealing initiation temperature SIT within the range of from 70° C. to 110° C., more preferably 80° C. to 100° C., even more preferably 85 to 95° C.

In a preferred embodiment, the polymer film satisfies the following relation:

$$Tm-SIT \geq 35° C.$$

wherein
Tm is the melting temperature of the polymer film,
SIT is the sealing initiation temperature.
More preferably, the film satisfies the following relation:

$$Tm-SIT \geq 40° C., \text{ even more preferably } Tm-SIT \geq 45° C.$$

If the polymer film has two or more melting transitions, it is the highest melting temperature which is to be used as Tm in the relation outlined above.

The polymer film can be orientated, e.g. uniaxially or biaxially oriented.

The polymer film can be prepared by standard methods commonly known to the skilled person.

According to a further aspect, the present invention provides a process for preparing the polypropylene composition as described above, comprising:
(i) preparing as a first propylene polymer fraction a propylene homopolymer or a propylene copolymer comprising comonomer units derived from at least one $C_{5-12}$ alpha-olefin in a first polymerization reactor PR1,
(ii) transferring the first propylene polymer fraction obtained in the first polymerization reactor to a second polymerization reactor PR2 and preparing a second propylene polymer fraction by polymerizing propylene and at least one $C_{5-12}$ alpha-olefin in the presence of the first propylene polymer fraction, thereby obtaining a reactor blend of the first and second propylene polymer fractions,
(iii) transferring the reactor blend of step (ii) into a third polymerization reactor PR3 and preparing a third propylene polymer fraction by polymerizing propylene and ethylene in the presence of the reactor blend of step (ii), thereby obtaining a reactor blend of the first, second and third propylene polymer fractions.

If present in step (i), the at least one $C_{5-12}$ alpha-olefin is preferably the same as in step (ii).

Preferably, no separate $C_{5-12}$ alpha-olefin feed is introduced into the third polymerization reactor PR3. However, the third polymerization reactor PR3 may contain unreacted $C_{5-12}$ alpha-olefin from the second polymerization reactor PR2.

Preferably, the first, second and third propylene polymer fractions prepared in steps (i), (ii) and (iii) correspond to those fractions as already described above, i.e. propylene polymer fractions P1, P2, and P3.

Preferably, the split between the first propylene polymer fraction of PR1 and the second propylene polymer fraction of PR2 is 70/30 to 30/70, more preferably 60/40 to 40/60.

Preferably, the split between the reactor blend of step (ii) (i.e. the fractions of PR1 and PR2) and the third propylene polymer fraction of PR3 is 80/20 to 50/50, more preferably 80/20 to 55/45.

Preferably, the first polymerization reactor PR1 is a slurry reactor, such as a loop reactor.

Appropriate conditions for operating a slurry reactor such as a loop reactor and how to adjust and fine-tune final polymer properties are generally known to the skilled person or can be determined by routine experimentation. Exemplary operation conditions in the slurry reactor may be as follows:
temperature within the range of 40° C. to 110° C., more preferably between 60° C. and 100° C.,
pressure within the range of 20 bar to 80 bar, more preferably between 40 bar to 70 bar,
hydrogen can be added for controlling the molar mass in a manner known per se.

Preferably, the second and third polymerization reactors are both a gas phase reactor.

Appropriate conditions for operating a gas phase reactor and how to adjust and fine-tune final polymer properties are generally known to the skilled person or can be determined by routine experimentation. Exemplary operation conditions in the gas phase reactor may be as follows:
temperature within the range of 50° C. to 130° C., more preferably between 60° C. and 100° C.,
pressure within the range of 5 bar to 50 bar, more preferably between 15 bar to 40 bar,
hydrogen can be added for controlling the molar mass in a manner known per se.

Optionally, a pre-polymerization reactor is operated upstream the first polymerization reactor PR1.

Preferably, a catalyst composition comprising a single site catalyst is used in at least one of the polymerization reactors PR1 to PR3. In a preferred embodiment, the same single site catalyst is used in all polymerization reactors PR1 to PR3.

Catalyst compositions based on single site catalysts such as metallocene compounds are generally known to the skilled person.

The catalyst composition can be supported on an external support material or carrier such as an inorganic oxide (e.g. a silica support of sufficiently high pore volume and/or BET surface area).

Alternatively, it can be preferred to use a catalyst composition comprising solid catalyst particles which do not contain any external support material. This type of catalyst composition is described e.g. in WO 03/051934 and can be prepared by an emulsion solidification technology.

In a preferred embodiment, the catalyst composition is a solid catalyst system (SCS) which has a porosity measured according ASTM 4641 of less than 1.40 ml/g and/or a surface area measured according to ASTM D 3663 of lower than 25 m$^2$/g.

Preferably the solid catalyst system (SCS) has a surface area of lower than 15 m$^2$/g, yet still lower than 10 m$^2$/g and most preferred lower than 5 m$^2$/g, which is the lowest measurement limit. The surface is measured according to ASTM D 3663 (N$_2$).

Alternatively or additionally it is preferred that the solid catalyst system (SCS) has a porosity of less than 1.30 ml/g and more preferably less than 1.00 ml/g. The porosity has been measured according to ASTM 4641 (N$_2$). In another preferred embodiment the porosity is not detectable when determined with the method applied according to ASTM 4641 (N$_2$).

Furthermore the solid catalyst system (SCS) typically has a mean particle size of not more than 500 µm, i.e. preferably in the range of 2 to 500 µm, more preferably 5 to 200 µm. It is in particular preferred that the mean particle size is below 80 µm, still more preferably below 70 µm. A preferred range for the mean particle size is 5 to 70 µm, or even 10 to 60 µm.

As stated above the transition metal (M) is preferably zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"$_2$, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$-, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the transition metal compound has the formula (II)

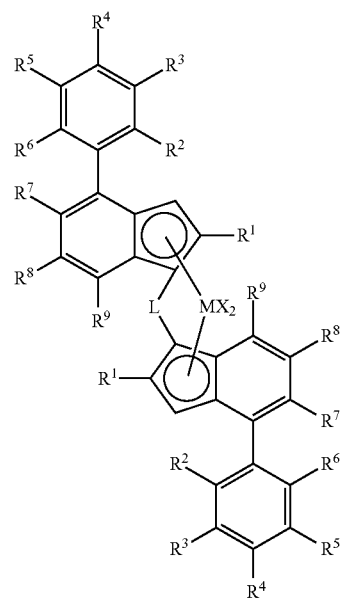

wherein
M is zirconium (Zr) or hafnium (Hf), preferably zirconium (Zr),
X are ligands with a σ-bond to the metal "M", preferably those as defined above for formula (I),
  preferably chlorine (Cl) or methyl (CH$_3$), the former especially preferred,
$R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
  preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl,
$R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl,
$R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), SiR$^{10}$$_3$, GeR$^{10}$$_3$, OR$^{10}$, SR$^{10}$ and NR$^{10}$$_2$, wherein R$^{10}$ is selected from the group consisting of linear saturated C$_1$-C$_{20}$ alkyl, linear unsaturated C$_1$ to C$_{20}$ alkyl, branched saturated C$_1$ to C$_{20}$ alkyl, branched unsaturated C$_1$ to C$_{20}$ alkyl, C$_3$ to C$_{20}$ cycloalkyl, C$_6$ to C$_{20}$ aryl, C$_7$ to C$_{20}$ alkylaryl, and C$_7$ to C$_{20}$ arylalkyl, optionally containing one or more heteroatoms of groups 14 to 16 of the Periodic Table (IUPAC), and/or R$^7$ and R$^8$ being optionally part of a C$_4$ to C$_{20}$ carbon ring system together with the indenyl carbons to which they are attached, preferably a C$_5$ ring, optionally one carbon atom can be substituted by a nitrogen, sulfur or oxygen atom, R$^9$ are equal to or different from each other and are selected from the group consisting of hydrogen, linear saturated C$_1$ to C$_{20}$ alkyl, linear unsaturated C$_1$ to C$_{20}$ alkyl, branched saturated C$_1$ to C$_{20}$ alkyl, branched unsaturated C$_1$ to C$_{20}$ alkyl, C$_3$ to C$_{20}$ cycloalkyl, C$_6$ to C$_{20}$ aryl, C$_7$ to C$_{20}$ alkylaryl, C$_7$ to C$_{20}$ arylalkyl, OR$^{10}$, and SR$^{10}$, preferably R$^9$ are equal to or different from each other and are H or CH$_3$, wherein R$^{10}$ is defined as before, L is a bivalent group bridging the two indenyl ligands, preferably being a C$_2$R$^{11}_4$ unit or a SiR$^{11}_2$ or GeR$^{11}_2$, wherein, R$^{11}$ is selected from the group consisting of H, linear saturated C$_1$ to C$_{20}$ alkyl, linear unsaturated C$_1$ to C$_{20}$ alkyl, branched saturated C$_1$ to C$_{20}$, branched unsaturated C$_1$ to C$_{20}$ alkyl, C$_3$ to C$_{20}$ cycloalkyl, C$_6$ to C$_{20}$ aryl, C$_7$ to C$_{20}$ alkylaryl or C$_7$ to C$_{20}$ arylalkyl, optionally containing one or more heteroatoms of groups 14 to 16 of the Periodic Table (IUPAC), preferably Si(CH$_3$)$_2$, SiCH$_3$C$_6$H$_{11}$, or SiPh$_2$, wherein C$_6$H$_{11}$ is cyclohexyl.

Preferably the transition metal compound of formula (II) is C$_2$-symmetric or pseudo-C$_2$-symmetric. Concerning the definition of symmetry it is referred to Resconi et al. Chemical Reviews, 2000, Vol. 100, No. 4 1263 and references herein cited.

Preferably the residues R$^1$ are equal to or different from each other, more preferably equal, and are selected from the group consisting of linear saturated C$_1$ to C$_{10}$ alkyl, linear unsaturated C$_1$ to C$_{10}$ alkyl, branched saturated C$_1$ to C$_{10}$ alkyl, branched unsaturated C$_1$ to C$_{10}$ alkyl and C$_7$ to C$_{12}$ arylalkyl. Even more preferably the residues R$^1$ are equal to or different from each other, more preferably equal, and are selected from the group consisting of linear saturated C$_1$ to C$_6$ alkyl, linear unsaturated C$_1$ to C$_6$ alkyl, branched saturated C$_1$ to C$_6$ alkyl, branched unsaturated C$_1$ to C$_6$ alkyl and C$_7$ to C$_{10}$ arylalkyl. Yet more preferably the residues R$^1$ are equal to or different from each other, more preferably equal, and are selected from the group consisting of linear or branched C$_1$ to C$_4$ hydrocarbyl, such as for example methyl or ethyl.

Preferably the residues R$^2$ to R$^6$ are equal to or different from each other and linear saturated C$_1$ to C$_4$ alkyl or branched saturated C$_1$ to C$_4$ alkyl. Even more preferably the residues R$^2$ to R$^6$ are equal to or different from each other, more preferably equal, and are selected from the group consisting of methyl, ethyl, iso-propyl and tert-butyl.

Preferably R$^7$ and R$^8$ are equal to or different from each other and are selected from hydrogen and methyl, or they are part of a 5-methylene ring including the two indenyl ring carbons to which they are attached. In another preferred embodiment, R$^7$ is selected from OCH$_3$ and OC$_2$H$_5$, and R$^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In another preferred embodiment, the transition metal compound is rac-dimethylsilanediyl bis(2-methyl-4-phenyl-1,5,6,7-tetrahydro-s-indacen-1-yl)zirconium dichloride.

In another preferred embodiment, the transition metal compound is rac-dimethylsilanediyl bis(2-methyl-4-phenyl-5-methoxy-6-tert-butylindenyl)zirconium dichloride.

Preferably, the solid catalyst system (SCS) comprises a cocatalyst comprising an element of group 13 of the periodic table (IUPAC), for instance the cocatalyst comprises a compound of Al.

Examples of such cocatalyst are organo aluminium compounds, such as aluminoxane compounds.

Particularly preferred cocatalysts are the aluminoxanes, in particular the C$_1$ to C$_{10}$-alkylaluminoxanes, most particularly methylaluminoxane (MAO).

Preferably, the organo-zirconium compound of formula (I) and the cocatalyst (Co) of the solid catalyst system (SCS) represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or MgCl$_2$ or porous polymeric material, which is otherwise commonly used in heterogeneous catalyst systems, i.e. the catalyst is not supported on external support or carrier material. As a consequence of that the solid catalyst system (SCS) is self-supported and it has a rather low surface area.

According to a further aspect, the present invention relates to the use of the polypropylene composition as described above or the polymer film as described above for a preparing heat-sealed package.

The heat-sealed package can be flexible or semi-rigid.

The present invention will now be described in further detail by the following Examples.

EXAMPLES

I. Measuring Methods

If not otherwise indicated, the parameters mentioned in the present application are measured by the methods outlined below.

1. Comonomer content by NMR spectroscopy

Quantitative nuclear-magnetic resonance (NMR) spectroscopy was used to quantify the tacticity, regio-regularity and comonomer content of the polymers. Quantitative $^{13}$C {$^1$H} NMR spectra recorded in the molten-state using a Bruker Advance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. Standard single-pulse excitation was employed utilising the NOE at short recycle delays and the RS-HEPT decoupling scheme. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm. Characteristic signals corresponding to regio defects and comonomer were observed.

The tacticity distribution was quantified through integration of the methyl region between 23.6-19.7 ppm correcting for any sites not related to the stereo sequences of interest.

Specifically the influence of regio defects and comonomer on the quantification of the tacticity distribution was corrected for by subtraction of representative regio defect and comonomer integrals from the specific integral regions of the stereo sequences.

The isotacticity was determined at the triad level and reported as the percentage of isotactic triad (mm) sequences with respect to all triad sequences:

$$[mm]\% = 100*(mm/(mm+mr+rr))$$

where mr represents the sum of the reversible mr and rm triad sequences.

The presence of 2,1 erythro regio defects was indicated by the presence of the two methyl sites at 17.7 and 17.2 ppm and confirmed by other characteristic sites.

Characteristic signals corresponding to other types of regio defects were not observed.

The amount of 2,1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary (1,2) inserted propene and all other present regio defects:

$$P_{total} = P_{12} + P_{21e}$$

The mole percent of 2,1 erythro regio defects was quantified with respect to all propene:

$$[21e]\ mol\ \% = 100*(P_{21e}/P_{total})$$

Characteristic signals corresponding to the incorporation of $C_{5-12}$ alpha-olefin were observed. The amount isolated $C_{5-12}$ alpha-olefin incorporated in $PPC_{5-12}PP$ sequences was quantified using the integral of the corresponding sites accounting for the number of reporting sites per comonomer.

The amount isolated 1-hexene incorporated in PPHPP sequences was quantified using the integral of the αB4 sites at 44.1 ppm accounting for the number of reporting sites per comonomer:

$$H = I[\alpha B4]/2$$

With sites indicative of consecutive incorporation not observed the total 1-hexene comonomer content was calculated solely on this quantity:

$$H_{total} = H$$

The amount isolated 1-octene incorporated in PPOPP sequences was quantified using the integral of the αB6 sites at 44.0 ppm accounting for the number of reporting sites per comonomer:

$$O = I[\alpha B6]/2$$

With sites indicative of consecutive incorporation not observed the total 1-octene comonomer content was calculated solely on this quantity:

$$O_{total} = O$$

Characteristic signals corresponding to the incorporation of ethylene were observed. The amount isolated ethylene incorporated in PPEPP sequences was quantified using the integral of the Sαγ sites at 37.8 ppm accounting for the number of reporting sites per comonomer:

$$E = I[S\alpha\gamma]/2$$

The amount consecutively incorporated ethylene in PPEEPP sequences was quantified using the integral of the Sβδ site at 26.9 ppm accounting for the number of reporting sites per comonomer:

$$EE = IS\beta\delta$$

Sites indicative of further types of ethylene incorporation e.g. PPEPEPP and PPEEEPP were quantified from characteristic signals as EPE and EEE and accounted for in a similar way as PPEEPP sequences. The total ethylene comonomer content was calculated based on the sum of isolated, consecutive and non consecutively incorporated ethylene:

$$E_{total} = E + EE + EPE + EEE$$

The total mole fraction of comonomer in the polymer was calculated as:

$$f_E = (E_{total}/(E_{total} + P_{total} + C_{5-12;total})$$

$$f_{C5-12} = (E_{total}/(E_{total} + P_{total} + C_{5-12;total})$$

The mole percent comonomer incorporation in the polymer was calculated from the mole fraction according to:

$$[C_{5-12}]\ mol\ \% = 100*f_{C5-12}$$

$$[E]\ mol\ \% = 100*f_E$$

The weight percent 1-hexene and ethylene incorporation in the polymer was calculated from the mole fraction according to:

$$[H]\ wt\ \% = 100*(f_H*84.16)/((f_E*28.05)+(f_H*84.16)+((1-(f_E+f_H))*42.08))$$

$$[E]\ wt\ \% = 100*(f_E*28.05)/((f_E*28.05)+(f_H*84.16)+((1-(f_E+f_H))*42.08))$$

The weight percent 1-octene and ethylene incorporation in the polymer was calculated from the mole fraction according to:

$$[O]\ wt\ \% = 100*(f_O*112.21)/((f_E*28.05)+(f_O*112.21)+((1-(f_E+f_O))*42.08))$$

$$[E]\ wt\ \% = 100*(f_E*28.05)/((f_E*28.05)+(f_O*112.21)+((1-(f_E+f_O))*42.08))$$

2. Amount of xylene solubles (XS, wt.-%)

The amount of xylene solubles was determined at 25° C. according ISO 16152; first edition; Jul. 1, 2005.

3. MFR (230° C., 2.16 kg)

Melt flow rate MFR (230° C., 2.16 kg) was measured according to ISO 1133 (230° C., 2.16 kg load).

4. Melting temperature ($T_m$) and melting enthalpy ($\Delta H_m$ crystallization temperature ($T_c$) and crystallization enthalpy ($\Delta H_c$):

Measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and crystallization enthalpy are determined from the cooling step, while melting temperature and melting enthalpy are determined from the second heating step. Melting and crystallization temperatures were taken as the peaks of endotherms and exotherms.

5. Haze

Haze was determined according to ASTM D 1003-07 on 60×60×2 mm³ plaques injection moulded in line with EN ISO 1873-2 using a melt temperature of 200° C.

6. Transparency and Clarity

Determined according to ASTM D1003-00 on 60×60×2 mm³ plaques injection moulded in line with EN ISO 1873-2 using a melt temperature of 200° C.

7. Sealing initiation temperature (SIT):

The method determines the sealing temperature range (sealing range) of polymer films. The sealing temperature range is the temperature range, in which the films can be sealed according to conditions given below.

The lower limit (heat sealing initiation temperature (SIT)) is the sealing temperature at which a sealing strength of >1 N is achieved. The upper limit (sealing end temperature (SET)) is reached, when the films stick to the sealing device.

The sealing range is determined on a DTC Hot tack tester Model 52-F/201 with a single layer film of 25 μm thickness with the following further parameters:

Specimen width: 25 mm
Seal Pressure: 0.66 N/mm²
Seal Time: 1 sec
Cool time: 30 sec (Cool time: Time between sealing and testing (measuring of sealing strength). The films are cooled down at room temperature for 30 sec.)

Peel Speed: 42 mm/sec
Start temperature: 80° C.
End temperature: 150° C.

The single layer film is folded or lapped on itself and an area of the overlapped film is then sealed at each sealbar temperature and seal strength (force) is determined at each step.

8. Intrinsic viscosity is measured according to DIN ISO 1628/1, October 1999 (in Decalin at 135° C.).

9. Calculation of Comonomer Content, Xylene Solubles XS and MFR (2.16 kg, 230° C.) of the Individual Propylene Polymer Fractions P2 and P3, Respectively Calculation of comonomer content of the propylene polymer fraction P2:

$$\frac{C(P1+P2) - w(P1) \times C(P1)}{w(P2)} = C(P2) \quad (I)$$

wherein
w(P1) is the weight fraction [in wt.- %] of the propylene polymer fraction P1 in the blend of propylene polymer fractions P1 and P2,
w(P2) is the weight fraction [in wt.- %] of the propylene polymer fraction P2 in the blend of propylene polymer fractions P1 and P2,
C(P1) is the comonomer content [in wt.- %] of the propylene polymer fraction P1,
C(P1+P2) is the comonomer content [in wt.- %] of the blend of propylene polymer fractions P1 and P2,
C(P2) is the calculated comonomer content [in wt.- %] of the propylene polymer fraction P2.

Calculation of the amount of xylene solubles XS of the propylene polymer fraction P2:

$$\frac{XS(P1+P2) - w(P1) \times XS(P1)}{w(P2)} = XS(P2) \quad (II)$$

wherein
w(P1) is the weight fraction [in wt.- %] of the propylene polymer fraction P1 in the blend of propylene polymer fractions P1 and P2,
w(P2) is the weight fraction [in wt.- %] of the propylene polymer fraction P2 in the blend of propylene polymer fractions P1 and P2,
XS(P1) is the amount of xylene solubles XS [in wt.- %] of the propylene polymer fraction P1,
XS(P1+P2) is the amount of xylene solubles XS [in wt.- %] of the blend of propylene polymer fractions P1 and P2,
XS(P2) is the calculated amount of xylene solubles XS [in wt.- %] of the propylene polymer fraction P2.

Calculation of melt flow rate $MFR_2$ (230° C.) of the propylene polymer fraction P2:

$$MFR(P2) = 10^{\left[\frac{\log(MFR(P1+P2)) - w(P1) \times \log(MFR(P1))}{w(P2)}\right]} \quad (III)$$

wherein
w(P1) is the weight fraction [in wt.- %] of the propylene polymer fraction P1 in the blend of propylene polymer fractions P1 and P2,
w(P2) is the weight fraction [in wt.- %] of the propylene polymer fraction P2 in the blend of propylene polymer fractions P1 and P2,
MFR(P1) is the melt flow rate $MFR_2$ (230° C.) [in g/10 min] of the propylene polymer fraction P1,
MFR(P1+P2) is the melt flow rate $MFR_2$ (230° C.) [in g/10 min] of the blend of propylene polymer fractions P1 and P2,
MFR(P2) is the calculated melt flow rate $MFR_2$ (230° C.) [in g/10 min] of the propylene polymer fraction P2.

Calculation of comonomer content of the propylene polymer fraction P3:

$$\frac{C(P1+P2+P3) - w(P1+P2) \times C(P1+P2)}{w(P3)} = C(P3) \quad (IV)$$

wherein
w(P1+P2) is the weight fraction [in wt.- %] of the amount of propylene polymer fractions P1 and P2 in the blend of propylene polymer fractions P1, P2 and P3,
w(P3) is the weight fraction [in wt.- %] of the propylene polymer fraction P3 in the blend of propylene polymer fractions P1, P2 and P3,
C(P1+P2) is the comonomer content [in wt.- %] of the blend of propylene polymer fractions P1 and P2,
C(P1+P2+P3) is the comonomer content [in wt.- %] of the blend of propylene polymer fractions P1, P2 and P3,
C(P3) is the calculated comonomer content [in wt.- %] of the propylene polymer fraction P3.

II. Preparation of Samples

Polypropylene samples have been prepared. The catalyst used in the polymerization process was a metallocene catalyst as described in example 10 of WO 2010/052263A1.

Reaction conditions are summarized in Table 1:

|  | Example | CE1 | CE2 | CE3 | CE4 | CE5 | IE1 | IE2 | IE3 | IE4 |
|---|---|---|---|---|---|---|---|---|---|---|
| Loop | Reactor temperature (° C.) | 70 | 70 | 70 | 70 | 70 | 70 | 70 | 70 | 75 |
|  | MFR2 (g/10 min) | 4.3 | 4.0 | 4.7 | 3.8 | 4.3 | 3.3 | 3.0 | 4.3 | 4.0 |
|  | C6 content (wt %) | 0 | 1.2 | 1.3 | 1.4 | 0 | 1.6 | 1.8 | 1.7 | 0 |
|  | Split loop/(loop + GPR1) % | 34 | 45 | 47 | 44 | 34 | 46 | 45 | 49 | 49 |
|  | Split with respect to final reactor blend (%) | 34 | 45 | 41 | 38 | 29 | 30 | 30 | 38 | 29 |
| GPR1 | Reactor temperature (° C.) | 85 | 85 | 85 | 85 | 85 | 85 | 85 | 85 | 85 |
|  | MFR2 (g/10 min) C6 content, total (wt %) | 13 | 8.4 | 8.7 | 8.9 | 13 | 9.8 | 9.9 | 9.7 | 7.1 |
|  |  | 3.9 | 4.9 | 4.9 | 4.8 | 3.9 | 4.5 | 4.4 | 4.9 | 4.4 |
|  | calculated C6 content in GPR fraction, (wt %) | 5.9 | 7.3 | 7.1 | 7.0 | 5.9 | 6.3 | 6.0 | 6.8 | 8.6 |
|  | Split GPR1/(loop + GPR1) % | 66 | 55 | 53 | 56 | 66 | 54 | 55 | 51 | 51 |
|  | Split with respect to final reactor blend (%) | 66 | 55 | 47 | 49 | 56 | 36 | 36 | 39 | 31 |
| GPR2 | Reactor temperature (° C.) |  | 80 | 80 | 80 | 80 | 80 | 80 | 80 | 80 |
|  | C2/C3 ratio feed GPR2 (kg/kg) |  | 0 | 0.15 | 0.28 | 0.3 | 0.3 | 0.3 | 0.3 | 0.2 |
|  | Split % |  | 12 | 13 | 15 | 34 | 34 | 23 | 40 |  |

The properties of the prepared polypropylene compositions are summarized in Table 2. Sealing performance was measured on a single layer film.

TABLE 2

| Ex. | CE1 | CE2 | CE3 | CE4 | CE5 | IE1 | IE2 | IE3 | IE4 |
|---|---|---|---|---|---|---|---|---|---|---|
| C6 (wt %-NMR) | 3.5 | 4.4 | 3.7 | 4 | 2.8 | 3.3 | 3.4 | 4.2 | 3.1 |
| C2 (wt %-NMR) | 0 | 0 | 0 | 0.4 | 1.3 | 3.4 | 3.3 | 2.1 | 2.5 |
| C6 (mol %-NMR) | 1.8 | 2.3 | 1.9 | 2 | 1.4 | 1.7 | 1.7 | 2.2 | 1.6 |
| C2 (mol %-calc.) | 0 | 0 | 0 | 0.6 | 1.9 | 5.0 | 4.9 | 3.2 | 3.7 |
| Total comonomer (mol %) | 1.8 | 2.3 | 1.9 | 2.6 | 3.3 | 6.7 | 6.6 | 5.4 | 5.3 |
| C6 in XS (wt %-NMR) |  |  |  |  | 0.2 | 0.2 | 1.1 | 1.4 | 1.4 |
| C2 in XS (wt %-NMR) |  |  |  |  | 8.5 | 10.1 | 9.6 | 9.1 | 6.1 |
| XS (wt %) | 1.41 | 7.4 | 0.97 | 5.8 | 16 | 34.1 | 34.1 | 22.9 | 40.4 |
| INTRINSIC VISCOSITY OF XS (dL/g) | n.m. | n.m. | n.m. | n.m. | n.m. | 0.98 | 1.04 | 0.96 | 1.24 |
| DSC of whole material | | | | | | | | | |
| Tm (° C.) | 149 | 141 | 140.3 | 134 | 148 | 134.5 | 135 | 133.8 | 148.7 |
| Tc (° C.) | 101.2 | 100.4 | 105.2 | 98.1 | 98.3 | 95.3 | 94.5 | 96.5 | 98.5 |
| SEALING PERFORMANCE | | | | | | | | | |
| SEALING INITIATION TEMPERATURE (° C.) | 108 | 102 | 110 | 104 | 104 | 88 | 88 | 90 | 88 |
| SEALING END TEMPERATURE (° C.) | 128 | 122 | 110 | 104 | 125 | 116 | 118 | 118 | 132 |
| Tm-SIT (° C.) | 41 | 39 | 30.3 | 30 | 44 | 46.5 | 47 | 43.8 | 60.7 |
| HTC on IM 60 × 60 × 2 mm | | | | | | | | | |
| HAZE % | 81.6 | 87 | 80.8 | 82.5 | 78.3 | 63.4 | 62.7 | 71.2 | 61.6 |
| CLARITY % | 81.7 | 82.6 | 90.2 | 91.7 | 87.5 | 94.3 | 96 | 96.9 | 97.1 |

As demonstrated by the data of Table 2, polymer compositions according to the present invention have improved sealing and optical properties.

The invention claimed is:

1. A polypropylene composition comprising comonomer units derived from ethylene in an amount of from 0.5 wt % to 25 wt %, and from at least one $C_{5-12}$ alpha-olefin in an amount of from 1.0 mol % to 3.0 mol %, wherein the polypropylene composition has an amount of xylene solubles (XS) of at least 20 wt %, and the xylene solubles have an amount of ethylene-derived comonomer units of from 4 wt % to 50 wt %.

2. The polypropylene composition according to claim 1, wherein the at least one $C_{5-12}$ alpha-olefin is selected from 1-hexene, 1-octene, or any mixture thereof.

3. The polypropylene composition according to claim 1, wherein the following relation is satisfied:

[C2(XS)×XS/100]/C2(total)≥0.90 wherein
C2(XS) is the amount in wt % of the ethylene-derived comonomer units in the xylene solubles,
XS is the amount in wt % of xylene solubles of the polypropylene composition, and
C2(total) is the amount in wt % of the ethylene-derived comonomer units in the polypropylene composition.

4. The polypropylene composition according to claim 1, wherein the xylene solubles contain an amount of comonomer units which are derived from the least one $C_5$-$C_{12}$ alpha-olefin of from 0.01 mol % to 2.0 mol %.

5. The polypropylene composition according to claim 1, wherein the total amount of comonomer units in the polypropylene composition is from 1.7 mol % to 33 mol %.

6. The polypropylene composition according to claim 1, wherein the polypropylene composition is a blend, comprising the following propylene polymer fractions P1, P2 and P3, wherein
P1 is a propylene homopolymer or a propylene copolymer comprising comonomer units derived from at least one $C_{5-12}$ alpha-olefin in an amount of less than 1.0 mol %,
P2 is a propylene copolymer comprising comonomer units derived from at least one $C_{5-12}$ alpha-olefin in an amount of from 2.0 mol % to 7.0 mol %, and
P3 is a propylene copolymer comprising ethylene-derived comonomer units in an amount of from 4 wt % to 50 wt %.

7. A polymer film comprising the polypropylene composition according to claim 1.

8. The polymer film according to claim 7, having a sealing initiation temperature SIT of 110° C. or less and/or satisfying the following relation:

Tm−SIT≥35° C.

wherein
Tm is the melting temperature of the polymer film, and
SIT is the sealing initiation temperature of the polymer film.

9. A process for preparing the polypropylene composition according to claim 1, comprising:
(i) preparing as a first propylene polymer fraction a propylene homopolymer or a propylene copolymer comprising comonomer units derived from at least one $C_{5-12}$ alpha-olefin in a first polymerization reactor PR1,
(ii) transferring the first propylene polymer fraction obtained in the first polymerization reactor to a second polymerization reactor PR2 and preparing a second propylene polymer fraction by polymerizing propylene and at least one $C_{5-12}$ alpha-olefin in the presence of the first propylene polymer fraction, thereby obtaining a reactor blend of the first and second propylene polymer fractions,
(iii) transferring the reactor blend of step (ii) into a third polymerization reactor PR3 and preparing a third propylene polymer fraction by polymerizing propylene and ethylene in the presence of the reactor blend of step (ii), thereby obtaining a reactor blend of the first, second and third propylene polymer fractions.

10. The process according to claim 9, wherein the split between the first propylene polymer fraction of PR1 and the second propylene polymer fraction of PR2 is 70/30 to 30/70; and/or wherein the split between the reactor blend of step (ii) and the third propylene polymer fraction of PR3 is 80/20 to 50/50.

11. The process according to claim 9, wherein the first polymerization reactor PR1 is a slurry reactor, and the second and third polymerization reactors are both gas phase reactors.

12. The process according to claim 9, wherein a single site catalyst is used in at least one of the polymerization reactors PR1 to PR3.

* * * * *